(12) United States Patent
Grimm et al.

(10) Patent No.: US 7,843,105 B2
(45) Date of Patent: Nov. 30, 2010

(54) BRUSH HOLDER COMPONENT WITH GROUND CONTACT PLATE

(75) Inventors: Andreas Grimm, Malsch (DE); Ilya Kuperberg, Karlsruhe (DE); Robert Heitz, Rastatt (DE); Jens Maerkle, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 12/094,192

(22) PCT Filed: Oct. 9, 2006

(86) PCT No.: PCT/EP2006/067198

§ 371 (c)(1),
(2), (4) Date: May 19, 2008

(87) PCT Pub. No.: WO2007/062891

PCT Pub. Date: Jun. 7, 2007

(65) Prior Publication Data

US 2008/0315711 A1 Dec. 25, 2008

(30) Foreign Application Priority Data

Nov. 30, 2005 (DE) .................. 10 2005 057 398

(51) Int. Cl.
*H02K 13/00* (2006.01)
*H02K 11/00* (2006.01)
*H01R 39/38* (2006.01)

(52) U.S. Cl. .............. 310/239; 310/71; 310/242; 310/244; 310/249; 29/592.1; 29/596

(58) Field of Classification Search ............. 310/239, 310/242, 244, 249, 71; 29/592.1, 596; *H02K 13/00, H02K 15/00, 11/00; H01R 39/38*
See application file for complete search history.

(56) References Cited

U.S. PATENT DOCUMENTS

| 3,045,137 | A | * | 7/1962 | Simmons et al. | ...... 310/216.068 |
| 4,398,135 | A | * | 8/1983 | Busch et al. | ................. 318/443 |
| 4,614,886 | A | * | 9/1986 | Schneider et al. | ............. 310/83 |
| 4,673,837 | A | * | 6/1987 | Gingerich et al. | ........... 310/239 |
| 5,194,769 | A | * | 3/1993 | Ade et al. | ...................... 310/51 |
| 5,196,750 | A | * | 3/1993 | Strobl | ........................ 310/239 |

(Continued)

FOREIGN PATENT DOCUMENTS

DE 198 04 369 8/1999

(Continued)

OTHER PUBLICATIONS

JP 05041368 Published Feb. 19, 1993 (Abstract Only).

*Primary Examiner*—Quyen Leung
*Assistant Examiner*—John K Kim
(74) *Attorney, Agent, or Firm*—Michael J. Striker

(57) ABSTRACT

Electric motor, as well as a brush mount component (34) for positioning of carbon brushes with respect to a commutator (30) of an electric motor (12), having at least one attachment means (55) for fixing the brush mount component (34) on a printed circuit board (28), with an earth contact plate (70) being mounted on the brush mount component (34) and being designed symmetrically with respect to the arrangement of the carbon brushes (32). A method for production of an electric motor such as this is also described.

17 Claims, 5 Drawing Sheets

U.S. PATENT DOCUMENTS

Figure 1:
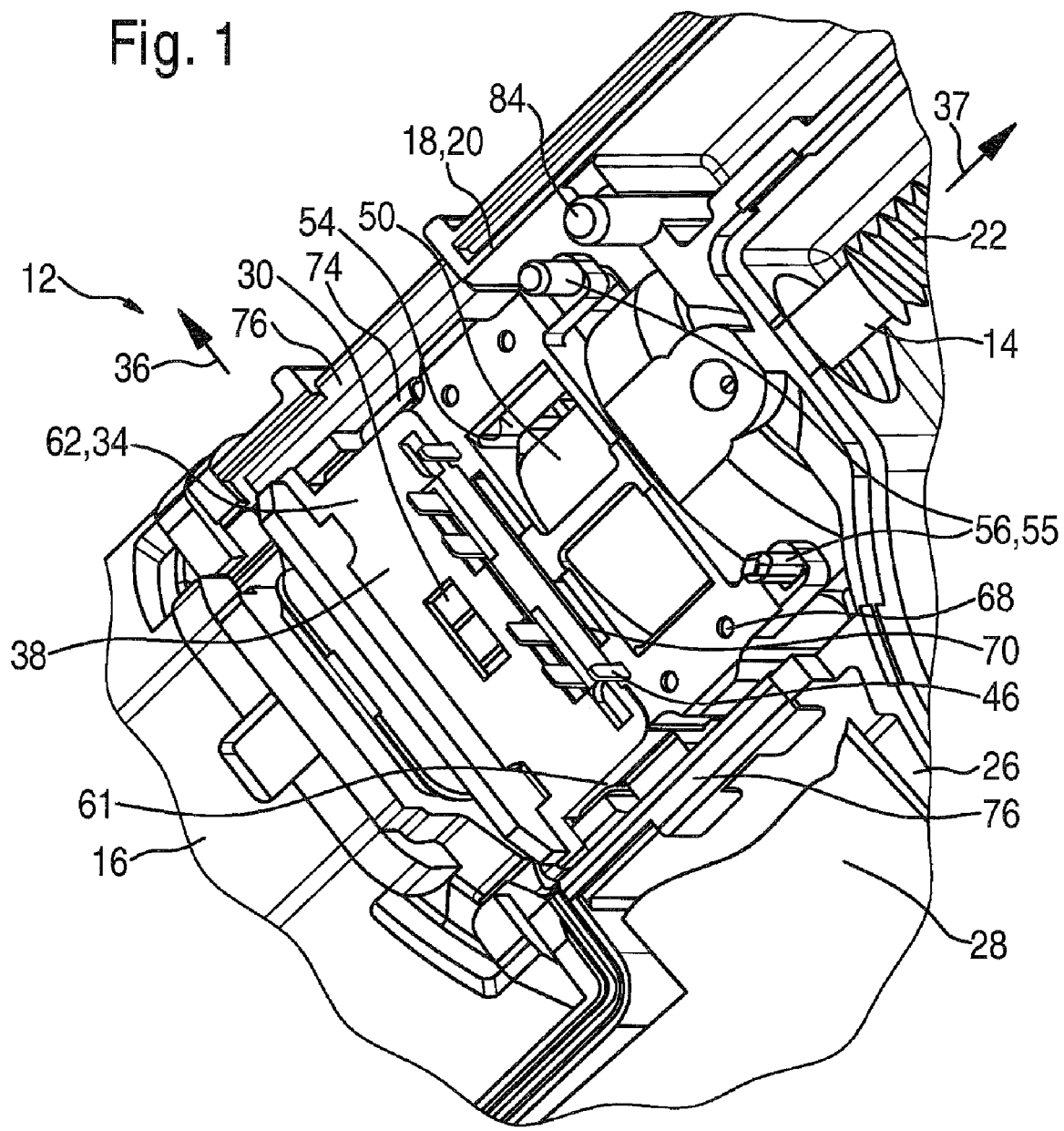

| | | | |
|---|---|---|---|
| 5,510,664 | A | 4/1996 | Suzuki et al. |
| 5,942,819 | A * | 8/1999 | Burgess et al. ................ 310/51 |
| 5,957,682 | A | 9/1999 | Kamal et al. |
| 6,037,693 | A | 3/2000 | Marth et al. |
| 6,043,576 | A * | 3/2000 | Weber et al. ............. 310/68 B |
| 6,580,194 | B2 * | 6/2003 | Mizutani et al. ............ 310/239 |
| 6,768,243 | B1 * | 7/2004 | Yamazaki et al. ........... 310/239 |
| 6,944,934 | B2 * | 9/2005 | Matsushita et al. ........... 29/598 |
| 7,230,362 | B2 | 6/2007 | Benkert et al. |
| 7,755,232 | B2 * | 7/2010 | Winkler et al. ................ 310/72 |
| 2004/0245886 | A1 * | 12/2004 | Uchida ....................... 310/239 |
| 2005/0140242 | A1 * | 6/2005 | Bender ....................... 310/239 |
| 2005/0189829 | A1 * | 9/2005 | Thomson et al. .............. 310/71 |
| 2005/0264126 | A1 * | 12/2005 | Lee ............................ 310/234 |
| 2008/0315711 | A1 * | 12/2008 | Grimm et al. ............... 310/239 |

FOREIGN PATENT DOCUMENTS

| | | |
|---|---|---|
| DE | 100 10 439 | 9/2001 |
| EP | 1 528 656 | 5/2005 |
| GB | 2 248 348 | 4/1992 |
| JP | 6-98513 | 4/1994 |

* cited by examiner

BRUSH HOLDER COMPONENT WITH GROUND CONTACT PLATE

PRIOR ART

The invention relates to a brush holder component having a ground contact plate and to an electric motor containing such a brush holder component, as well as to a method for producing such an electric motor.

From German Patent Disclosure DE 100 10 439 A1, an actuator with an electric motor is known, in which the shaft of the electric motor, with a commutator located on it, is supported in a gearbox that is connected to a pole cup. For electrically contacting the commutator, the actuator has a brush holder with carbon brushes located in quivers, and before its assembly the brush holder is loosely coupled to a printed circuit board. After that, the brush holder is inserted together with the printed circuit board into the lower housing shell and secured to the housing, for instance by means of screws. In the assembly, both the printed circuit board and the brush holder are guided relative to the housing by guide elements. Because of the loose coupling of the brush holder to the printed circuit board before its assembly, electrical connection lines of the components located on the brush holder are embodied correspondingly flexibly. If the gearbox is made of plastic rather than metal, electromagnetic interference radiation occurs from the brush fire and has an interfering effect on the electronics unit of the electric motor and the surroundings of the electric motor.

DISCLOSURE OF THE INVENTION

The brush holder component of the invention and the electric motor and its production method that have the definitive characteristics of the independent claims have the advantage that by the arrangement of the ground contact plate on the brush holder component, the carbon brushes are efficiently shielded, so as to suppress electromagnetic interference. By means of the symmetrical design of the ground contact plate with its spring tongues and pins to suit the spatial arrangement of the carbon brushes, the electromagnetic interference generated by the brush fire can be suppressed very effectively over the entire three-dimensional area. Because the ground contact plate is secured to the brush holder component, an additional assembly process for the ground contact plate is dispensed with.

Advantageous refinements of and improvements to the characteristics recited in the independent claims are obtained by the provisions recited in the dependent claims. Especially effective electromagnetic shielding is attained if the ground contact plate has an axial end face, extending transversely to the armature shaft, against which lateral leg sides each extend—virtually around the spring levers—and these leg sides approximately form a right angle with the axial end face. This kind of shaping of the ground contact plate is especially well suited, in combination with the shielding plate of the gearbox, the printed circuit board, and the pole cup, of forming a closed metal shielding cage around the brush arrangement.

To establish good electrical contact between the ground contact plate and the shielding plate of the housing, both leg sides have tablike spring contacts, which in the installed state rest over a large area on the shielding plate. As a result, the ground contact plate is especially effectively brought to ground potential.

If pins that reach through corresponding openings in the bottom face of the brush holder component are integrally formed onto the ground contact plate, then these pins can very simply be connected to a printed circuit board located parallel to the bottom face, in order to establish a ground contact on the printed circuit board.

It is advantageous if the ground contact plate can be thrust into the brush holder component directly—without using further connecting means—in order to form a form lock with it. This dispenses with one additional assembly step for securing the ground contact plate.

It is especially favorable if the carbon brushes are embodied as hammer brushes with a spring lever, onto which lever a clamping element is integrally formed. By the firm clamping of the hammer brushes in suitable receptacles in the brush holder component, one additional assembly process for securing and adjusting the hammer brushes is also dispensed with.

If the brush holder component serves not only to support the carbon brushes and the ground contact plate but also to receive further components, such as interference suppression coils, then this system holder can be preassembled as a separate unit, making more-flexible manufacture possible.

In the electric motor of the invention, the brush holder component is advantageously located on a printed circuit board that extends approximately parallel to the bottom face of the brush holder component and at a tangent to the commutator. As a result, a direct, short, and symmetrical electrical connection between the ground contact plate and the printed circuit board is made possible, and as a result the printed circuit board contributes to suppressing the electromagnetic interference.

Because the ground contact plate and the other components located on the brush holder component reach with their pins through corresponding openings in the bottom face into bores of the printed circuit board, the pins can be electrically contacted with the printed circuit board in a simple way using a standardized soldering process. For instance, the printed circuit board may also be manufactured in a separate, automated production process, for instance by means of THRS methods.

In an alternative version, the ground contact plate can also be embodied in two parts, the two parts being formed essentially by large-area spring contact tongues. By the symmetrical arrangement of the two separate contact tongues relative to the arrangement of the carbon brushes (32), the shielding plate can optimally shield against the brush fire.

Alternatively to securing the ground contact plate to the brush holder component, the one- or two-piece ground contact plate can also be secured directly to the printed circuit board. To that end, the pins of the spring tongues electrically contact the printed circuit board in the immediate vicinity of the electrical contacting of the carbon brushes.

By the symmetrical shaping of the shielding plate in the gearbox relative to the carbon brushes, or to the armature shaft, especially effective shielding against the electromagnetic interference is possible. Combining the symmetrical shielding plate with the symmetrical ground contact plate brings about an advantageous shaping of the metal shielding cage around the carbon brushes.

The shielding plate can be attached to the pole cup in a very simple way by means of axial extensions, as a result of which the axial extensions serve as ground terminals for the shielding plate. The ground terminals can be electrically contacted to the pole cup in one process with the connection of the pole cup to the gearbox. The plastic deformation of wedging tabs on the flange of the pole cup here is especially economical. By means of the symmetrical arrangement of the two or three ground terminals, for instance, relative to the carbon brush arrangement, a reduction in interfering radiation can again be attained.

For producing a sturdy electrical contact in the assembly of the brush holder component, large-area, plane stop faces are embodied on the brush holder component, and the spring tongues are pressed against them.

The shielding cage, which is composed of the shielding plate, the ground contact plate, and the ground layer of the printed circuit board, advantageously extends over the entire axial width of the carbon brushes, in order to shield them effectively.

In the method according to the invention for producing the electric motor, the ground contact plate can very simply be preassembled on the brush holder component and electrically connected to the printed circuit board. Then one additional work step for mechanically securing the ground contact plate is dispensed with. At the same time, with the mounting of the carbon brushes on the commutator, reliable electrical contacts are made between the ground contact plate and the shielding plate, so that an effective shielding cage for the carbon brushes is produced without additional effort and expense for assembly.

Advantageously, the ground contact plate, together with the other components, can be soldered to the printed circuit board in one operation, and as a result, in addition to the electrical connection, a mechanically rigid connection between the brush holder component and the printed circuit board is also made.

DRAWINGS

Figure 2:
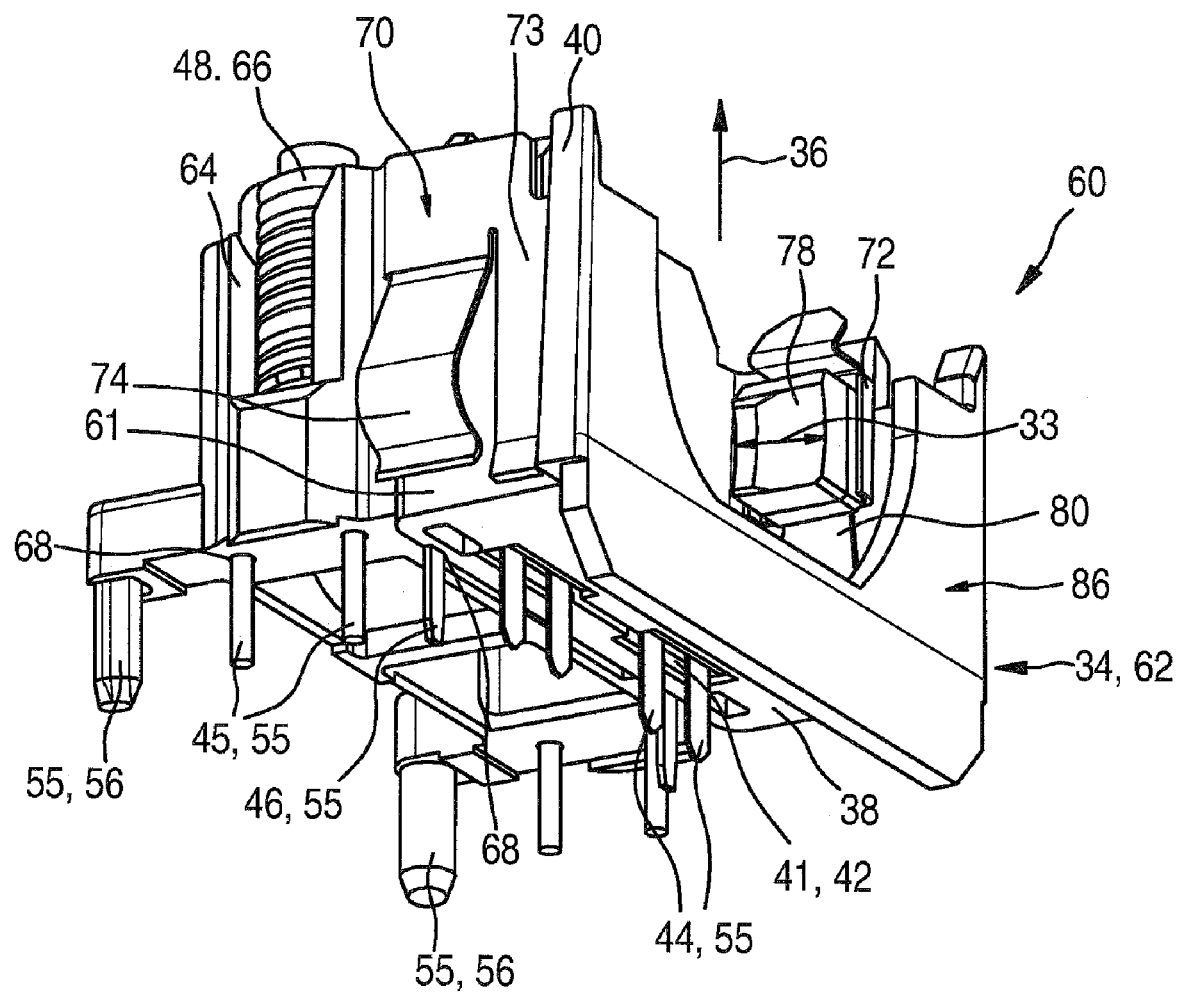
Figure 3:
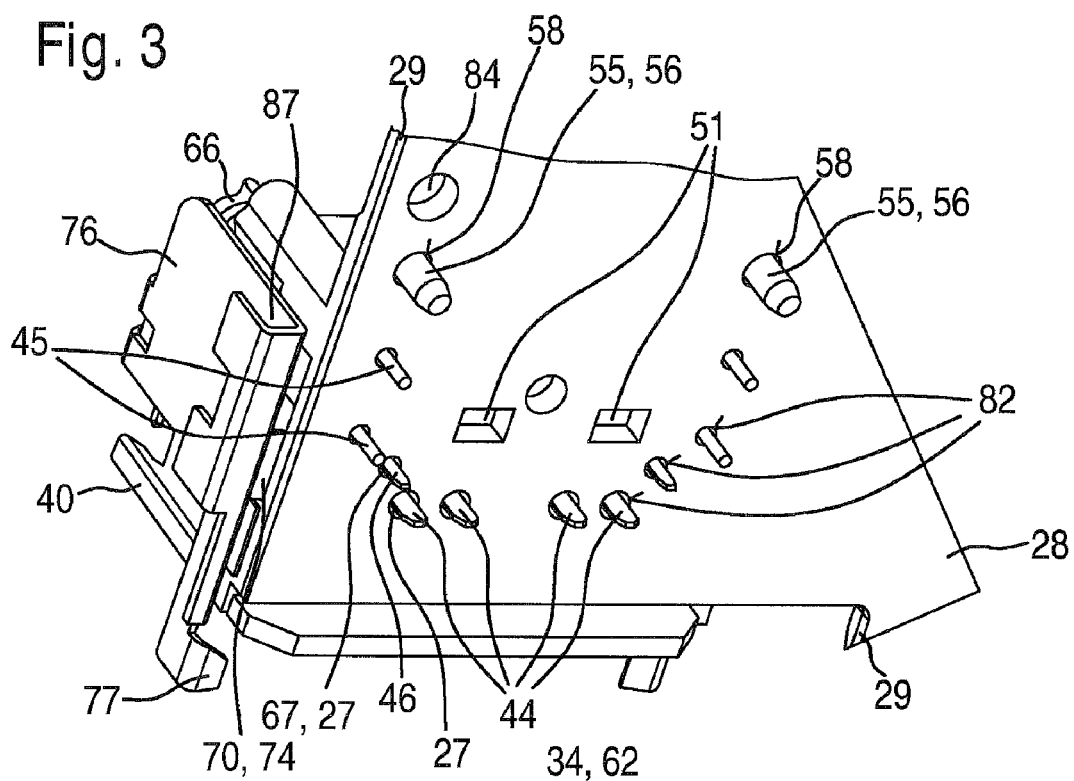
Figure 4:
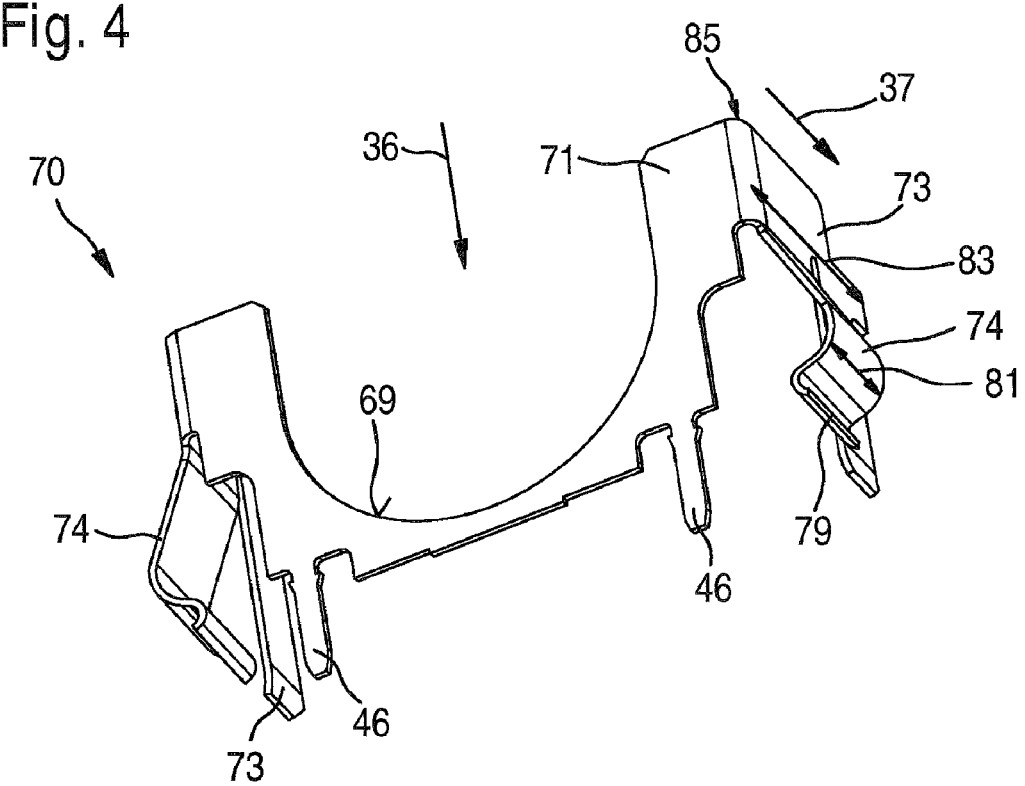
Figure 5:
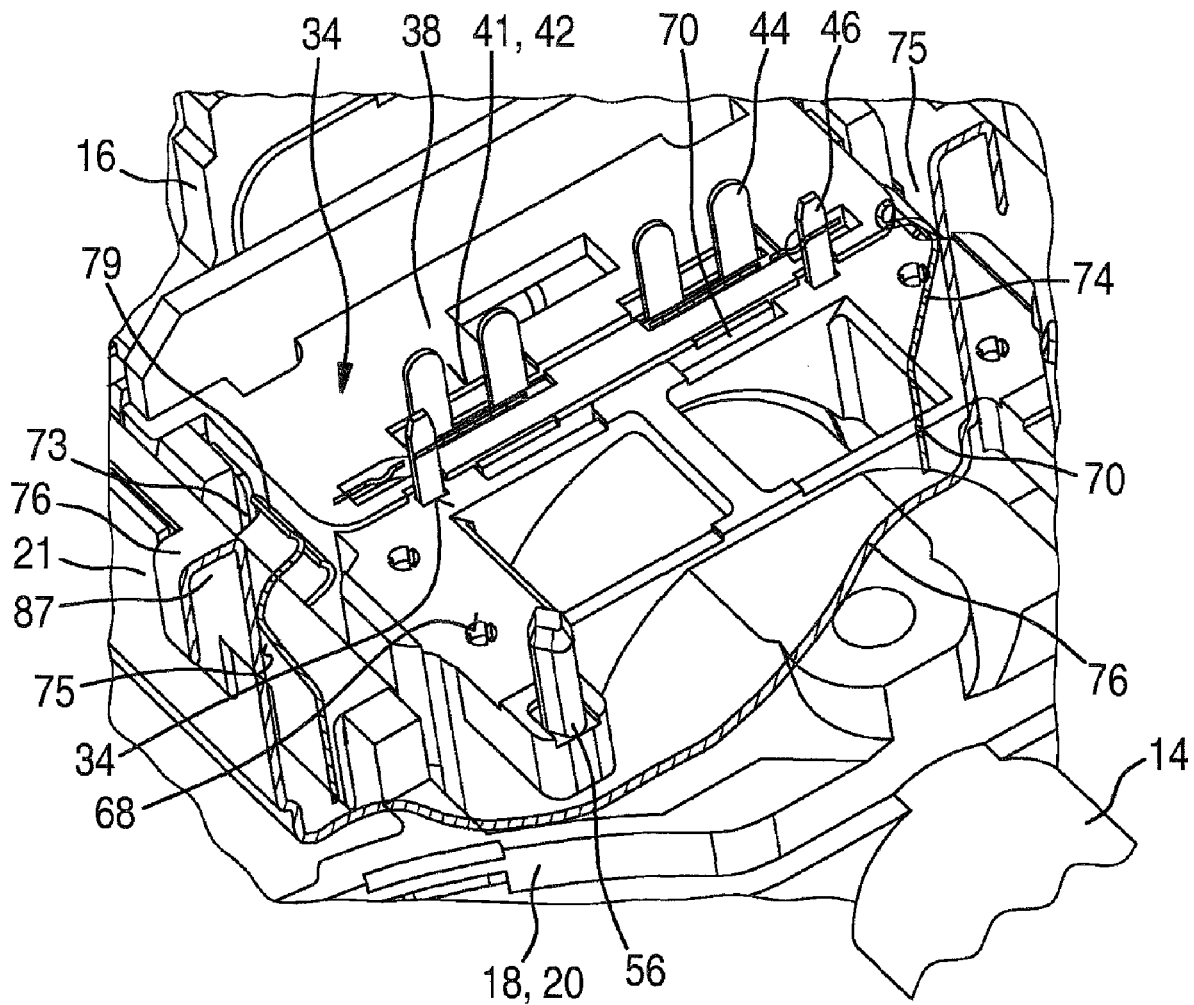
Figure 6:
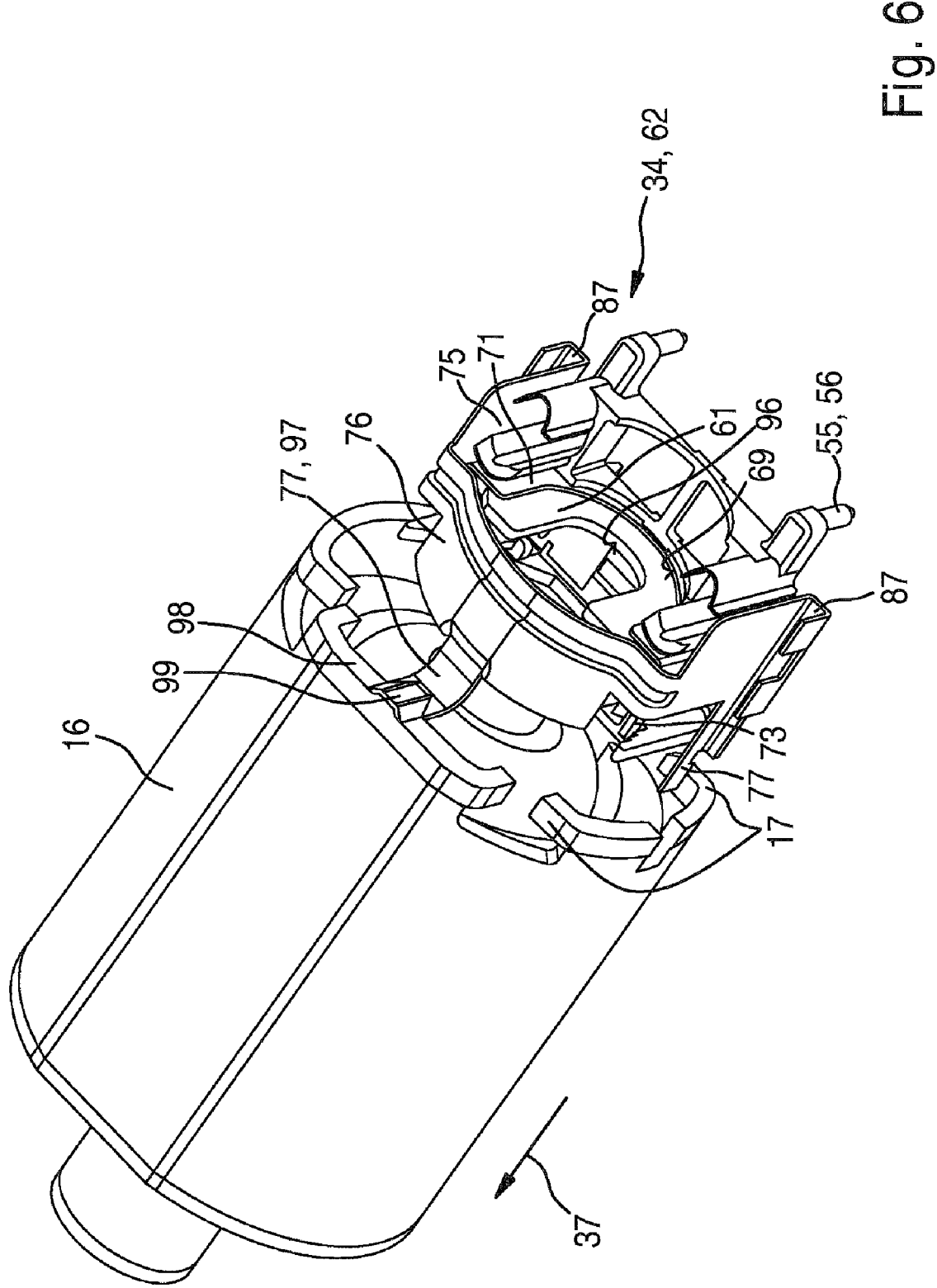

In the drawings, various exemplary embodiments of a device according to the invention are shown and will be described in further detail in the ensuing description. Shown are:

FIG. 1, one exemplary embodiment of an electric motor of the invention;

FIG. 2, an enlarged view of the brush holder component of FIG. 1;

FIG. 3, a brush holder component of FIG. 2, preassembled on a printed circuit board;

FIG. 4, an unmounted ground contact plate;

FIG. 5, schematically, a section through an arrangement as in FIG. 1; and FIG. 6, an illustration of a further exemplary embodiment.

DESCRIPTION

In FIG. 1, a detail of an electric motor 12 according to the invention is shown, in which an armature shaft 14 extends from a pole housing 16 into a gearbox 18 connected to it. The gearbox 18 has a first shell-shaped housing part 20, which after the mounting of the electric motor 12 and of a gear 22, not shown in further detail, is closed with a housing cap. The electric motor 12 moreover has an electronics housing 26, which is embodied for instance in one piece with the lower housing shell 20 and receives a printed circuit board 28. A commutator 30 is located on the armature shaft 14 and is supplied with current via carbon brushes 32 embodied as hammer brushes. The carbon brushes 32 are clamped into a separate brush holder component 34, which is shown enlarged in FIG. 2. The brush holder component 34 is embodied as a U-shaped plastic part and can be installed in the radial direction 36 to the armature shaft 14. In a bottom face 38 of the brush holder component 34 that is located between two legs 40 of the brush holder component 34, a slot 42 is made, as an opening 41, through which contact pins 44 of the carbon brushes 32 reach. These contact pins 44, together with pins 46 of a ground contact plate 70 that is likewise located on the brush holder component 34, are connected electrically to the printed circuit board 28 (see FIG. 3). In FIG. 1, the printed circuit board 28, which extends approximately parallel to the armature shaft 14 and to the housing cap, is cut off in order to open up the view to the brush holder component 34. Axially adjacent to the commutator 30, a ring magnet 50 is located on the armature shaft 14; it cooperates with corresponding Hall sensors 51, which reach through corresponding openings 54 in the brush holder component 34. For adjusting the brush holder component 34 relative to the printed circuit board 28, centering pins 56 are integrally formed onto the bottom face 38 as securing elements, which engage corresponding centering openings 58 in the printed circuit board 28. The brush holder component 34 thus forms a U-shaped cage 60, which partitions off the hammer brushes 32 from the gear 22 and the electronics housing 26, in order for instance to prevent them from becoming soiled with carbon dust.

In FIG. 2, the brush holder component 34 is shown as a system holder 62 for a preassembled unit, which in addition to the hammer brushes 32 receives still other components 48. To that end, the brush holder component 34 has sleevelike receptacles 64, in which interference suppression coils 66 are located that with their pins 45 reach through corresponding holes 68 in the bottom face 38. The ground contact plate 70 is also supported on the brush holder component 34 and surrounds the hammer brushes 32 in the shape of a U, so as to shield against the electromagnetic interference that is created by the brush fire. The ground contact plate 70 here rests in form-locking fashion, with an axial end face 71 and two angled leg faces 73, against corresponding cage walls 61 of the brush holder component 34. The ground contact plate 70 has pins 46, which reach through holes 68 in the bottom face 38, in order to establish the electrical connection with the printed circuit board 28. The holes 68 and the opening 41 are located coincidentally to bores 82 that are shaped out of the printed circuit board 28 that extends along the bottom face 38. Along the two legs 40, the ground contact plate 70 has two large-area spring tongues 74, which after the installation in the gearbox 18 rest resiliently on diametrically opposed stop faces 75 of a shielding plate 76 that in turn is electrically contacted with the pole housing 16. The hammer brushes 32 have carbons 78, which are secured to one end of a spring lever 80. For instance, the carbons 78 are secured by means of laser welding or are press-fitted into an integrally formed-on carbon receptacle 79 of the spring lever 80. The contact pins 44, which reach through the slot 42 in the bottom face 38, are located on the other end of the spring lever 80.

In FIG. 3, the brush holder component 34 is located as a preassembled system holder 62 on the printed circuit board 28. The printed circuit board 28 has many bores 82, which are engaged by the pins 46 of the ground contact plate 70, the contact pins 44 of the carbon brushes 32, and the pins 45 of the further components 48. As an example here, the four pins 45 of the two interference suppression coils 66 are shown. Once the brush holder component 34 has been inserted in form-locking fashion with its centering pins 56 into the corresponding centering openings 58 of the printed circuit board 28, the pins 44, 45 and 46 are soldered to the printed circuit board 28 by means of what is known as the THRS method. In it, the openings 82 in the printed circuit board 28 are filled with solder paste 27, and the components 48, 32 are introduced with their pins 46, 45, 44 into the openings 82 and are then heated—for instance in an oven—to cure the solder paste 27. This kind of automatic soldering method is very economical and very flexible with regard to the arrangement of the components 48 on the printed circuit board 28. Thus the pins 44, 45, 46, together with the solder paste 27, also represent fastening means 55 for a mechanically rigid connection of the brush holder component 34 to the printed circuit board 28. Thus once the brush holder component 34 is rigidly connected to the printed circuit board 28 both mechanically and electrically, the printed circuit board 28, with the brush holder component 34, is mounted radially on the armature shaft 14 located in the gearbox 18. In this process, the printed circuit board 28 is in turn adjusted relative to the gearbox 18 by means of centering elements 84. After the mounting of the preassembled system holder 62 in the radial direction 36, the spring tongues 74 of the ground contact plate 70 rest on the shielding plate 76, mounted beforehand in the gearbox 18.

In FIG. 4, a ground contact plate 70 is shown in the unmounted state. The axial end wall 71 of the ground contact plate 70 is embodied in the shape of a U and has a recess 69 for the armature shaft 14. The two pins 46 are integrally formed onto the axial end wall 71, symmetrically to the armature shaft 14. The two leg sides 73 are located approximately perpendicular to the axial end wall 71, and the entire ground contact plate 70 is embodied as a one-piece bent and stamped part. Large-area contact tongues 74 are embodied on the leg sides 73 and are curved radially outward, as viewed from the armature shaft 14. The contact tongues 74 have one free end 79, which is curved once again in the opposite direction, so that the S-shaped contact tongue 74, upon the assembly of the brush holder component 34, exerts a spring force against the shielding plate 76. The axial width 84 of the spring tongues 74 extends in this exemplary embodiment over at least half the axial width 83 of the ground contact plate 70, thus creating that a large area of contact with the opposed stop face 75. For premounting the ground contact plate 70, the ground contact plate is inserted in the radial direction 36 into the brush holder component 34, and the pins 46 pass through openings 68 in the bottom face 38. The axial end wall 71 forms an angle with the leg side 73, and this angle 85 rests in form-locking fashion against the corresponding cage walls 61 of the brush holder component 34.

In FIG. 5, the brush holder component 34 is shown with the preassembled ground contact plate 70 inside the gearbox 18. The preassembled system holder 62 in FIG. 2 is rotated 180° and inserted in the direction 36 into the housing shell 20. For the sake of clarity, in this view only the shielding plate 76 and the ground contact plate 70 are additionally shown in section. The gearbox 18 is embodied as a shell-shaped housing part 20, which is connected to the pole housing 16. The U-shaped shielding plate 76 has been placed in the housing part 20 before the mounting of the brush holder component 34. Grooves 87 on the free ends of the shielding plate 76 embrace the side walls 21 of the housing part 20 in order to fix the shielding plate 76 relative to the housing part 20. In the mounted state, the S-shaped spring tongues 74 rest with spring force on the stop faces 75 of the shielding plate 76. The free end 79 of the spring tongue 74 rests on the brush holder component 34, in order to generate a spring force. The symmetrically embodied ground contact plate 70, together with the symmetrically embodied shielding plate 76, forms a metal shielding cage, which extends over at least the axial width 33 of the carbons 78. For the sake of simplicity, the printed circuit board 28 is not shown in FIG. 5; its ground layer 29, together with the ground contact plate 70 and the shielding plate 76, closes the metal shielding cage over the entire circumference of the commutator 30.

FIG. 6 schematically shows a further exemplary embodiment, with a pole housing 16 but without a gearbox 18. The pole housing 16, on its open edge, has wedging tabs 17, which are plastically deformed for the sake of connection to the gearbox 18. The ground terminals 77 of the shielding plate 76 extend in the axial direction 37 as far as the wedging tabs 17, so that in the process of connecting the pole housing 16 to the gearbox 18, the ground terminals 77 are simultaneously put into electrical contact with the pole cup 16. As a result, the ground potential of the pole cup 16 is applied via the shielding plate 76 to the ground contact plate 70 and likewise, via the pins 46, to the ground contact 67 of the printed circuit board 28 (not shown). A third ground terminal 97 is embodied on the shielding plate 76; it is located centrally to the other two ground terminals 77 and therefore is likewise symmetrically located. The ground terminal 97 rests with its free end 99 on a flange 98 of the pole cup 16 and is pressed against the gearbox 18 in the process of connection to the gearbox 18, in order to establish a ground contact.

It should be noted that with regard to the exemplary embodiments shown in the drawings and to the description, manifold possible combinations of the various characteristics with one another are possible. For instance, the specific embodiment and mode of securing the brush holder component 34, the ground contact plate 70, and the corresponding shielding plate 76 can be varied accordingly. For instance, the ground contact plate 70 can be embodied as two spring contact tongues 74 located in the immediate vicinity of the brush holder component 34, directly on the printed circuit board 28. The connecting means between the brush holder component 34, or the pins 46, 45, 44, and the printed circuit board 28 can be adapted accordingly as well. The brush holder component 34 is preferably embodied as a system holder 62 for a preassembled unit, which before its radial installation in the housing part 20 is connected mechanically firmly to the printed circuit board 28. The electric motor 12 of the invention is used in particular for power windows, sliding roofs, or other convenience functions in the motor vehicle.

The invention claimed is:

1. A brush holder component (34) for positioning carbon brushes relative to a commutator (30) of an electric motor (12), comprising:
at least one fastening means (55) for fixing the brush holder component (34) on a printed circuit board (28); and
a ground contact plate (70), embodied symmetrically to the arrangement of carbon brushes (32), located on the brush holder component (34),
wherein the ground contact plate (70) has an axial end wall (71) with a recess (69) for an armature shaft (14) and two angled leg sides (73) that together surround the carbon brushes (32), wherein the ground contact plate is configured to efficiently suppress electromagnetic interferences produced by a brush fire of the carbon brushes.

2. The brush holder component (34) as defined by claim 1, wherein on each of two opposed leg sides (73) a respective spring tongue (74) is integrally formed on as a contact element.

3. The brush holder component (34) as defined by claim 1, wherein the ground contact plate (70) has pins (46) for electrically contacting the printed circuit board (28), which reach through a hole (68) in a bottom face (38) of the brush holder component (34).

4. The brush holder component (34) as defined by claim 1, wherein the ground contact plate (70) can be inserted by form locking—without the use of other connecting elements—directly into the brush holder component (34).

5. The brush holder component (34) as defined by claim 1, wherein the carbon brushes (32) are embodied as hammer brushes with clamping elements that are located on spring levers (80) and can be inserted into brush receptacles (86) of the brush holder component (34).

6. The brush holder component (34) as defined by claim 1, characterized by its use as a system holder (62) for further components (48), such as interference suppression coils (66) in particular.

7. An electric motor (12) having a brush holder component (34) as defined by claim 1, wherein a printed circuit board (28) is located along the bottom face (38) and at a tangent to the commutator (30), and the brush holder component (34) and the ground contact plate (70) are connected electrically and mechanically solidly to the printed circuit board (28).

8. The electric motor (12) as defined by claim 7, wherein the pins (46) of the ground contact plate (70)—and in particular pins of further components (48), such as interference suppression coils (66) and/or hammer brushes (32)—reach through holes (68, 41, 42) in the bottom face (38) of the brush holder component (34) into corresponding bores (82) in the printed circuit board (28), in order to establish an electrical ground contact (67) on the printed circuit board.

9. The electric motor (12) as defined by claim 7, wherein the ground contact plate (70) is formed of two identical separate parts—in particular spring tongues (74)—which are located symmetrically to the connection of the carbon brushes (32).

10. The electric motor (12) as defined by claim 7, wherein the pins (46) are integrally formed onto the spring tongues (74) and are connected to the printed circuit board (28) as close as possible to the pins (44) of the carbon brushes (32).

11. The electric motor (12) as defined by claim 7, wherein the electric motor (12) has a pole cup (16) and a gearbox (18) secured to it, and a shielding plate (76) which is embodied symmetrically to the arrangement of carbon brushes (32) is located in the gearbox (18).

12. The electric motor (12) as defined by claim 11, wherein the shielding plate (76) has at least two—and preferably three—symmetrical ground terminals (77), which are secured to the pole cup (16)—in particular by means of plastic deformation of the pole cup (16).

13. The electric motor (12) as defined by claim 11, wherein the shielding plate (76) has two diametrically opposed stop faces (75), on which the spring tongues (74), in the installed state, rest by spring force.

14. The electric motor (12) as defined by claim 11, wherein the shielding plate (76) is embodied in the shape of a U and together with the ground contact plate (70) and a ground layer (29) of the printed circuit board (28) forms a metal shield that is closed over the entire circumference and that extends in particular at least over the axial width (33) of the carbon brushes (32).

15. A method for producing an electric motor (12), in which an armature shaft (14), with a commutator (30) and a brush holder component (34), is received by a housing part (18, 20), comprising the following steps:

placing a shielding plate (76) radially in the housing part (20) and connecting said shielding plate (76) symmetrically to a pole housing (16);

inserting the armature shaft (14), with the commutator (30) supported on it, into the housing part (20);

slipping a ground contact plate (70) onto the brush holder component (34);

electrically contacting the ground contact plate (70) to the printed circuit board (28), and mechanically connecting the brush holder component (34) to the printed circuit board (28);

mounting the printed circuit board (28) with the brush holder component (34) in the radial direction (36) in the housing part (20), in the process of which the ground contact plate (70) is pressed with symmetrically arranged spring tongues (74) against corresponding stop faces (75) of the shielding plate (76); and radially joining a housing cap to the housing part (20).

16. The method as defined by claim 15, further comprising the step of soldering pins (46) of the ground contact plate (70) to the printed circuit board (28) before the assembly of the printed circuit board in one work step together with the initial soldering of interference suppression coils (66) and/or carbon brushes (32) located in the brush holder component (34).

17. The brush holder component (34) as defined by claim 1, wherein the ground contact plate (70) is formed as a one-piece, bent and stamped part.

* * * * *